United States Patent [19]

Birkholz

[11] Patent Number: 4,828,777

[45] Date of Patent: May 9, 1989

[54] METHOD AND APPARATUS FOR THE MANUFACTURE OF AN OTOPLASTIC SHELL

[75] Inventor: Ulrich Birkholz, Bayreuth, Fed. Rep. of Germany

[73] Assignee: Siemens Aktiengesellschaft, Berlin and Munich, Fed. Rep. of Germany

[21] Appl. No.: 49,301

[22] Filed: May 13, 1987

[30] Foreign Application Priority Data

May 16, 1986 [DE] Fed. Rep. of Germany ....... 3616533

[51] Int. Cl.[4] ....... B29C 39/10

[52] U.S. Cl. ....... 264/139; 264/162; 264/222; 264/227; 264/275; 249/55; 249/93; 249/175; 249/184

[58] Field of Search ....... 264/219, 220, 222, 225, 264/226, 227, 273, 275, 277, 278, 279, 279.1, 271.1, 162, 139; 181/129, 130, 135, 136; 425/275; 249/55, 91, 175, 184, 93

[56] References Cited

U.S. PATENT DOCUMENTS

| | | | |
|---|---|---|---|
| 1,753,817 | 4/1930 | Aber | 264/222 |
| 2,203,105 | 6/1940 | Roberts | 264/222 |
| 3,097,059 | 7/1963 | Hoffman . | |
| 3,208,102 | 9/1965 | Rubio . | |
| 3,345,737 | 10/1967 | Gordon . | |
| 3,440,314 | 4/1969 | Frisch | 264/222 |
| 3,475,528 | 10/1969 | Parks . | |
| 3,513,269 | 5/1970 | Wilson . | |
| 3,833,701 | 9/1974 | Johnson . | |
| 4,014,971 | 3/1977 | Perkins . | |
| 4,091,067 | 5/1978 | Kromer . | |
| 4,098,277 | 7/1978 | Mendell . | |
| 4,372,904 | 2/1983 | Gunn | 264/222 |
| 4,472,342 | 9/1984 | Carr | 264/222 |
| 4,569,812 | 2/1986 | Werwath | 264/222 |
| 4,617,429 | 10/1986 | Bellafiore | 264/222 |
| 4,652,414 | 3/1987 | Schlaegel | 264/222 |

FOREIGN PATENT DOCUMENTS

| | | |
|---|---|---|
| OS1487272 | 3/1969 | Fed. Rep. of Germany . |
| G8518681.3 | 7/1986 | Fed. Rep. of Germany . |
| 2084072 | 4/1982 | United Kingdom . |
| 2101521 | 1/1983 | United Kingdom . |

OTHER PUBLICATIONS

Siemens Congress News; 32nd International Congress of Hearing Instruments and Audiologists; 1987.

Hearing Instrument, vol. 35, No. 1, Jan., 1984, "A Tool for the Optimization of Hearing Aid Fittings," pp. 12–16.

*Primary Examiner*—James Lowe

*Assistant Examiner*—Jeremiah F. Durkin, II

*Attorney, Agent, or Firm*—Hill, Van Santen, Steadman & Simpson

[57] ABSTRACT

The combination of a die simulating the outside contour of an in-the-ear hearing aid module with an over-shell end cap which is seated on a die connector or neck projecting through a proximal hole of the over-shell is immersed into fluid otoplastic shell material which is situated in the negative of an ear impression. The hardened blank is proximally and distally freed of otoplastic shell material and is also proximally freed from the cap such that the die or a remaining part of the die can be easily and unproblematically removed in distal direction, so that the over-shell with the otoplastic shell material seated thereon remains as a finished otoplastic shell.

12 Claims, 2 Drawing Sheets

METHOD AND APPARATUS FOR THE MANUFACTURE OF AN OTOPLASTIC SHELL

BACKGROUND OF THE INVENTION

The invention is directed to a method for the manufacture of an otoplastic shell. It is likewise directed to an apparatus for the implementation of such a method.

Our German Utility Model Application No. 85 18 681.3, corresponding to U.S. application Ser. No. 875,929, now U.S. Pat. No. 4,739,512 discloses an in-the-ear hearing aid module which is insertable into the cavity of an over-shell on which the otoplastic shell is applied.

SUMMARY OF THE INVENTION

An object of the present invention is to provide a method and an apparatus with whose assistance the appertaining otoplastic shell can be manufactured in an optimally simple and fast way for an in-the-ear hearing aid module having an over-shell.

This object is achieved by casting out a negative of an ear impression with fluid otoplastic material following the steps of pulling an over-shell having a proximal hole onto a die simulating the outside contour of a housing of an in-the-ear hearing aid module, the die having a stem at its distal end and a connector or neck at its proximal end, the over-shell being pulled thereonto such that the connector or neck projects at least partially through the proximal hole. Next, a cap is put in place on that part of the connector or neck projecting from the hole and then the combination of the die, over-shell and cap is immersed into fluid otoplastic material situated in the negative of the ear impression and the combination is positioned in the most favorable integration position. Next a blank composed of the die, the over-shell, the cap and otoplastic material from the negative of the ear impression is removed after the otoplastic material has hardened. Finally, the blank is freed proximally and distally of otoplastic material and is also proximally freed of the cap such that the die or a remaining part of the die can be easily removed in a distal direction, so that the over-shell including the otoplastic material situated thereon remains as a finished otoplastic shell. It may also be preferred to proximally free the blank of otoplastic material at least up to an end face of the cap, the proposed cap being removed and the die or die residue seated in the over-shell being pressed out of the over-shell in a distal direction by exerting pressure onto the exposed connector or neck. Alternatively, the blank may be proximally freed of otoplastic and cap material up to an end face of the connector or neck of the die, the die or die residue situated in the over-shell being pressed out of the over-shell in a distal direction by exerting pressure on to the exposed connector or neck and any cap residue which is still present being removed.

In carrying out the above described method, the cap which is put in place on that part of the connector or neck projecting from the hole should at least partially include a smallest diameter that is greater than a diameter of the proximal hole in the over-shell. In the case of narrower auditory canals of the negative of the ear impression, a cap having a smallest diameter is put in place on that part of the connector or neck projecting from the hole but, for wider auditory canal parts of the negative of the ear impression, a cap is put in place on that part of the connector projecting from the hole which projects out of the first cap part having the smallest diameter and the cap is proximally expanded by at least one additional cap part having a greater diameter. Preferably, a cap is put in place whose smallest diameter is slightly greater than the diameter of a fixing element which is used for fixing an in-the-ear hearing aid module in the finished otoplastic shell. Also, preferably an over-shell is utilized whose proximal hole is essentially adapted to the diameter of the connector or neck of the die.

An apparatus for implementing the above described method comprises a die simulating the outside contour of the housing of an in-the-ear hearing aid module. The die has a stem at its distal end and has a connector or neck at its proximal end. An over-shell for the die has a proximal hole, and a cap is provided which is placeable onto the connector or neck of the die. The cap has at least a smallest diameter which is greater than the diameter of the proximal hole in the over-shell. The cap may have this smallest diameter throughout its length in the case of narrower auditory canal parts of the negative of the ear impression. When wider auditory canal parts are present, a stepped cap is to be provided, the stepped cap being composed of at least one first cap part having the smallest diameter and additional cap parts having a greater diameter. The diameter of the proximal hole of the over-shell is to be approximately identical to the diameter of the connector or neck of the die so that the two parts mate.

The cap which is put in place on the connector or neck enables a good centering of the hole in the over-shell relative to the otoplastic shell or otoplast surrounding the over-shell. The sound exit connector of an in-the-ear hearing aid module inserted into the over-shell of the finished otoplastic shell is thus also automatically centered such that, after insertion into the auditory canal of the hearing-impaired person, acoustical decoupling from the walls of the auditory canal is always guaranteed. The sound emitted from the earpiece of the in-the-ear hearing aid module will therefore emerge unimpeded from the in-the-ear hearing aid module into the auditory canal at the predetermined central position.

BRIEF DESCRIPTION OF THE DRAWINGS

Further advantages and details of the invention derive from the following specification of an exemplary embodiment with reference to the drawing.

Shown are.

DESCRIPTION OF THE PREFERRED EMBODIMENTS

Figure 1:
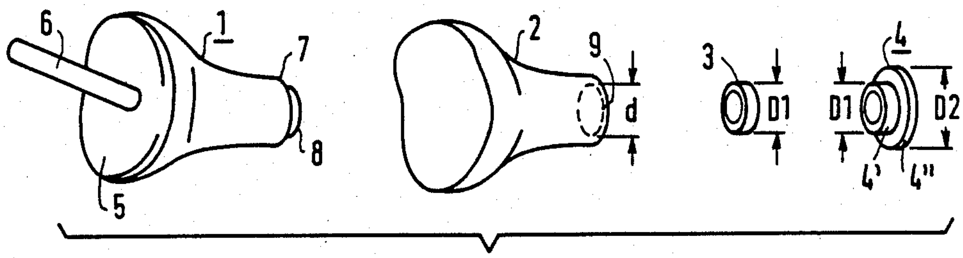
FIG. 1 is a die, an over-shell and two different caps which are utilized for the manufacture of an otoplastic shell in accord with the invention, shown in an exploded view.

FIG. 1 shows a die 1, an over-shell 2 mating thereto, and a first cap 3 or, respectively, second cap 4. The die 1 which, for example, is composed of shaped-stable material which is temperature-resistant up to at least 100° C. (for example, black rhyton), duplicates the outside contour of the housing of an in-the-ear hearing aid module (see, for example, FIG. 9). At its distal die end 5, it has a stem 6 and has a connector or neck 8 at its proximal die end 7. The over-shell which, for example, is composed of transparent, shape-stable and temperature-resistant material (for example, polymethyl-methacrylate, known under the trade name acrylic PMMA), contains a proximal hole 9. The diameter d of the hole 9 is essentially adapted to the diameter of the connector or neck 8 of the die 1.

The first cap 3 has a diameter D1 which is greater than the diameter d of the hole 9 in the over-shell 2. The second cap 4 is composed of a first, smaller cap part 4' and of a second, larger cap part 4''. The smaller cap part 4' is as high or thick as the cap 3 and also has a diameter D. The larger cap part 4'' has a diameter D2 which is greater than the diameter D1. In the present case, thus, the relationship $D2>D1>d$ applies.

The cap 3 having the smaller diameter D1 is used for narrower auditory canals and the cap 4 having the stepped diameters D1, D2 is used for wider auditory canals. If expedient, even further caps dimensioned or, respectively, stepped differently from the first and second cap can be additionally utilized. The cap is composed, for example, of tan Hostaform.

Figure 2:
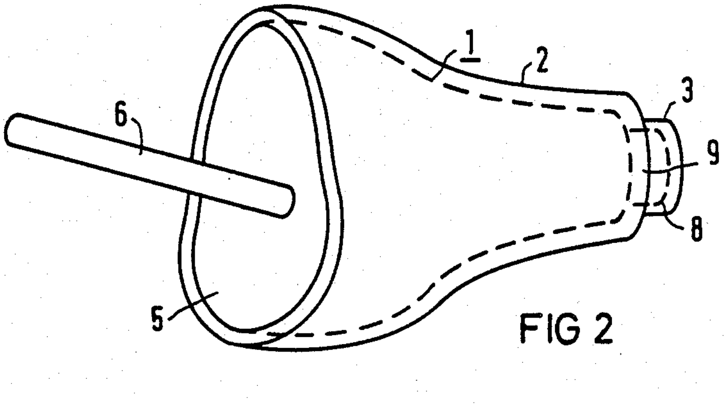
FIG. 2 is a perspective view of the component parts of FIG. 1 in their assembled condition.

FIG. 2 shows the component parts of FIG. 1 in their completely assembled condition. In this case, thus, the over-shell 2 is drawn over the die 1 such that the connector or neck 8 projects at least partially through the hole 9. The cap 3 is put in place on that part of the connector or neck 8 which projects from the hole 9 (the cap 3, for example, in the present case).

The continuation of the method of the invention is illustrated as method steps in accord with FIGS. 3 through 8.

Figure 3:
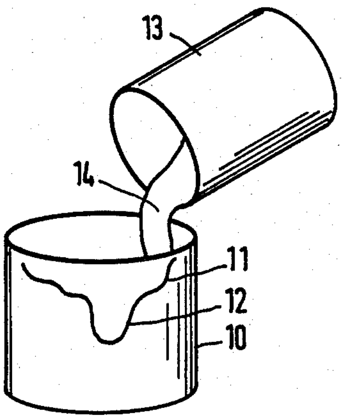
FIG. 3 is a perspective view of the method step of casting out the negative of an ear impression with liquid otoplastic shell material.

FIG. 3 shows a container 10 having a negative 11 of the ear impression (a plaster impression in the present case). The auditory canal part of the negative is indicated by reference numeral 12. A further container 13 contains fluid otoplastic shell material 14 (in the present case, for example, a polymethylmethacrylate, for example likewise acrylic PMMA, in powder-fluid form). The fluid otoplastic shell material 14 is cast into the negative 11 of the ear impression.

Figure 4:
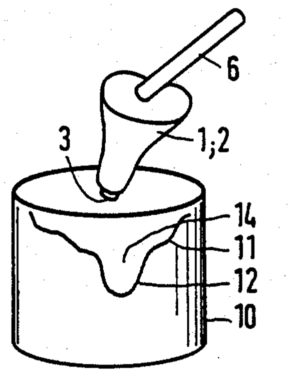
FIG. 4 is a perspective view of the method step of immersing the combination of die, over-shell and cap into the liquid otoplastic shell material.

In accord with FIG. 4, the combination of die, over-shell and cap is now immersed into the fluid otoplastic shell material 14.

Figure 5:
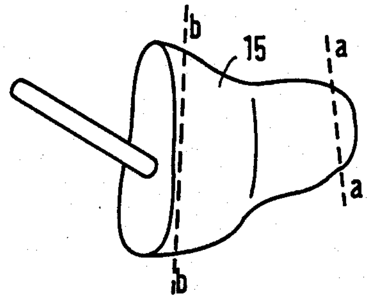
FIG. 5 is a perspective view the method step of further processing the blank after the otoplastic shell material has hardened and the removal of the blank from the negative of the ear impression.

After the otoplastic shell material has hardened, the blank 15 (FIG. 5) composed of die, over-shell, cap and otoplastic shell material is removed from the negative 11 of the ear impression. Subsequently, a blank 15, as indicated by the lines a—a and b—b in FIG. 5, is proximally freed of otoplastic shell material up to the cap 3 (lines a—a) and is distally freed of otoplastic shell material 13 up to the distal end 5 of the die 1 (lines b—b). The freeing is accomplished by grinding or sawing.

The proximal erosion or removal of otoplastic shell material along the lines a—a can be accomplished differently dependent on the type of cap employed and can also be accomplished differently given one and the same cap.

Figure 6:
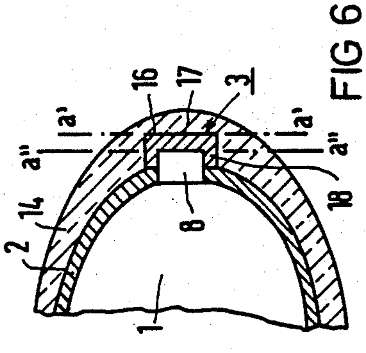

FIG. 6 shows an example including the cap 3. Here, for example, the otoplastic shell material can be removed along the lines a'—a' up to an end face 16 of the cap 3. The freed cap 3 can then be levered out, for example by means of a fine screwdriver, and the distally cut-off die 1 seated in the over-shell 2 can subsequently be pressed out of the over-shell 2 in distal direction by exerting pressure onto the exposed connector or neck. In accord with FIG. 6, however, the otoplastic shell material can also be removed up to the line a''—a''. In this case, a cap cover 17 is also removed and only an annular, residual cap part 18 now remains on the bank 15. After the residual die has been pressed out, this residual cap part 18 can likewise be removed.

Figure 7:
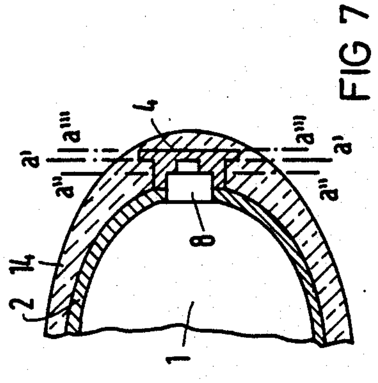
FIGS. 6 and 7 are partial side sectional views of the results of the further processing given different caps and different types of proximal removal of otoplastic shell material.

FIG. 7 shows an example including the cap 4. Here, the same conditions as in FIG. 6 for the lines a'—a' or, respectively, a''—a'' result by removal up to the line a'—a' or, respectively, a''—a''. The otoplastic shell material 14 can also be theoretically removed up to the end face of the second cap part 4'' of the cap 4 (line a''' through a''') and the cap 4 can be levered out. However, the otoplastic shell material must then be again removed up to the end face of the connector or neck 8 of the die 1 in a following after-processing step.

Figure 8:
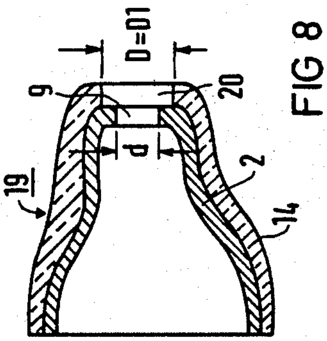
FIG. 8 is a side sectional view of the finished otoplastic shell.

As may be seen from FIG. 8, the proximal hole 9 of the over-shell 2 lies essentially centrally in a finished otoplastic shell 19. It is thus guaranteed that, given an in-the-ear aid module inserted into the ear, its sound exit opening always lies at a certain minimum distance from the skin tissue in the ear. As already initially set forth, optimum acoustical coupling to the inner ear is thereby guaranteed.

The diameter D of a proximal opening 20 of the otoplastic shell material 14 of the finished otoplastic shell 19 corresponds to the diameter D1 of the cap 3 or of the smaller cap part 4' of the cap 4.

Figure 9:
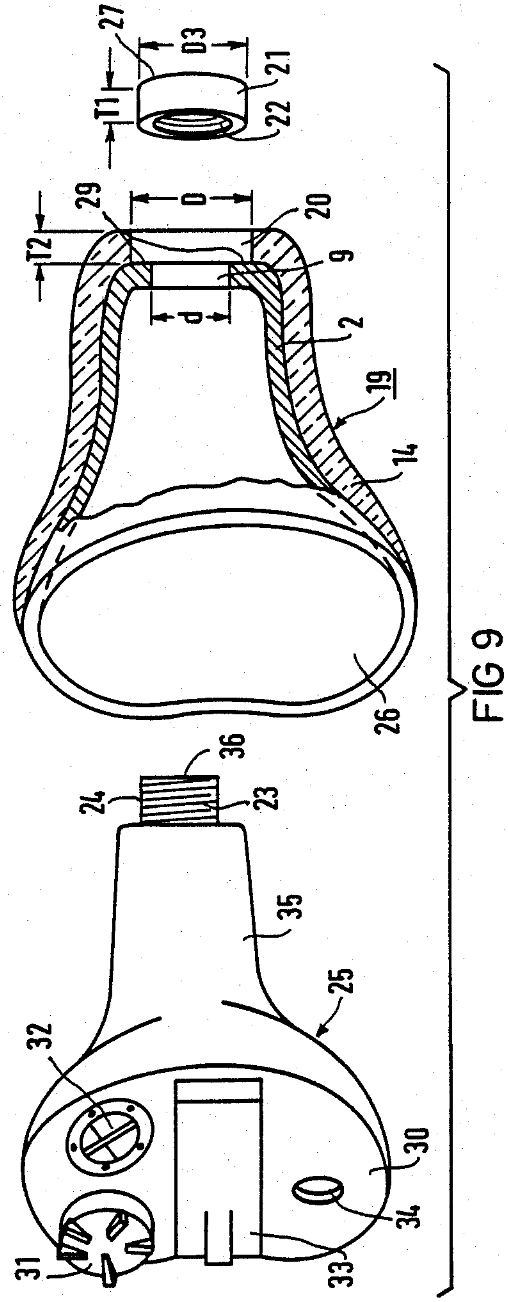
FIG. 9 is an in-the-ear hearing aid module together with a finished otoplastic shell in accord with FIG. 8 and with a cerumen cover which can be screwed onto a screw neck of the module, shown in an exploded view.

As shown in FIG. 9, the respectively smallest diameter D is always still large enough that a cerumen cover 21 having a diameter D3 can be inserted into the proximal opening 20 of the otoplastic shell material 14 of the finished otoplastic shell 19. Thus, the smallest diameter D1 of a cap is always at least slightly greater (for example 0.2 mm) than the diameter D3 of a cerumen cover 21. Thus, the expanded relationship $D2>D1 \simeq D>D3>d$ always applies.

The cerum cover 21 includes an inside thread 22 which, in accord with FIG. 9, mates with an outside thread 23 of a proximal screw neck 24 of an in-the-ear hearing aid module 25.

The in-the-ear hearing aid module 25 can then be introduced into a hollow interior 26 of the finished otoplastic shell 19, being introduced until the proximal screw neck 24 projects through the hole 9 into the proximal opening 20 of the otoplastic shell material 14. Subsequently, the cerumen cover 21 can be screwed onto the screw neck 24. The in-the-ear hearing aid module 25 is thus firmly seated in the finished otoplastic shell 19 and is seated acoustically tight therein.

Figure 10:
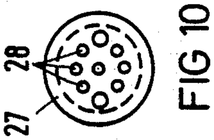
FIG. 10 is a plan view of the cerumen cover of FIG. 9.

In accord with FIG. 10, an end face 27 of the cerumen cover 21 includes sieve-like openings 28. It thus simultaneously serves as a cerumen trap.

A depth or thickness T1 of the cerumen cover 21 can roughly correspond to a depth or thickness T2 of the proximal opening 20 of the otoplastic shell material 14. In the assembled condition, thus, the end face 27 of the cerumen cover 21 terminates flush with the proximal end of the finished otoplastic shell 19, this being advantageous particularly given narrow auditory canals. The depth T1, however, can also be greater than the depth T2. The cerumen cover 21 then projects out of the proximal opening 20. The niche thereby formed between the otoplastic shell material and the cerumen cover can thus serve as an additional cerumen trap.

An exposed proximal annular part 29 of the over-shell 2 around the proximal hole 9 serves as an abutment for the screwed-on cerumen cover 21.

In FIG. 9, the in-the-ear hearing aid module 25 includes an adjustment knob 31 at its end face 34 for volume control, comprises a further adjustment element 32, a cover 33 for the battery compartment, and an opening 34 for the sound feed. The housing is referenced 35. The sound exit opening in the screw neck 24 is indicated at 36.

The over-shell 2 and the otoplastic shell material 14 in the present case are preferably fabricated of transparent material. An after-working, particularly subsequent introduction of an air supply channel (vent), is thereby considerably facilitated. The otoplastic shell material in accord with FIGS. 5 through 7 can likewise be removed just as easily since the limitations of the differently colored component parts die (for example, black) and cap (for example, tan) can be seen well through the transparent over-shell and otoplastic shell material.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A method for the manufacture of an otoplastic shell by use of a negative of an ear impression and fluid otoplastic shell material, comprising the steps of:

pulling an over-shell having a proximal hole onto a die simulating the outside contour of a housing of an in-the-ear hearing aid module, said die having a stem at its distal end and a connector or neck at its proximal and, being pulled thereonto such that part of the connector or neck extends from said hole;

putting a cap in place on that part of said connector or neck extending from said hole;

immersing the combination of said die, said over-shell and said cap into said fluid otoplastic shell material situated in the negative of the ear impression and positioning the combination in the most favorable integration position;

removing a blank composed of said die, said over-shell, said cap and otoplastic material from said negative of said ear impression after said otoplastic material has hardened;

freeing the blank proximally and distally of otoplastic shell material and also proximally freeing the blank of the cap such that the die or a remaining part of said die can be easily removed in a distal direction, so that the over-shell including the otoplastic shell material seated thereon remains as a finished otoplastic shell.

2. A method according to claim 1, wherein said blank is proximally freed of otoplastic shell material at least up to an end face of said cap; the exposed cap being removed and the die or die residue seated in the over-shell being pressed out of the over-shell in a distal direction by exerting pressure onto the exposed connector or neck.

3. A method according to claim 1, wherein the blank is proximally freed of otoplastic shell and cap material up to an end face of said connector or neck of said die, the die or die residue seated in the over-shell being pressed out of said over-shell in a distal direction by exerting pressure onto the exposed connector or neck and any cap residue which is still present being removed.

4. A method according to claim 1, wherein a cap is put in place on that part of said connector or neck projecting from said hole, said cap at least partially including a smallest diameter that is greater than a diameter of said proximal hole in said over-shell.

5. A method according to claim 4, wherein for narrower auditory canals of said negative of said ear impression, a cap having a smallest diameter is put in place on that part of said connector or neck projecting from said hole but, for wider auditory canal parts of said negative of said ear impression, a cap is put in place on said part of said connector projecting from said hole which projects out of the first cap part having said smallest diameter and is proximally expanded by at least one additional cap part having a greater diameter.

6. A method according to claim 4, wherein a cap is put in place whose smallest diameter is slightly greater than the diameter of a fixing element for fixing an in-the-ear hearing aid module in the finished otoplastic shell.

7. A method according to claim 1, wherein an over-shell is utilized whose proximal hole is essentially adapted to the diameter of the connector or neck of said die.

8. An apparatus for the manufacture of an otoplastic shell comprising a die simulating the outside contour of the housing of an in-the-ear hearing aid module, said die having a stem at its distal end and having a connector or neck at its proximal end, an over-shell for receiving therein said die and having a proximal hole for passage therethrough of said connector or neck such that part of said connector or neck extends completely through said hole, and a cap placeable onto that part of said connector or neck of said die extending through said hole.

9. An apparatus according to claim 8, wherein said cap has a smallest diameter along at least a portion of its length which is greater than the diameter of said proximal hole in said over-shell.

10. An apparatus according to claim 9, wherein a cap which has said smallest diameter throughout its length is provided for narrower auditory canal part of the negative of the ear impression.

11. An apparatus according to claim 9, wherein a stepped cap is provided for wider auditory canal part of said negative of said ear impression, said stepped cap being composed of at least one first cap part having said smallest diameter which is expanded by at least one additional cap part having a greater diameter.

12. An apparatus according to claim 9, wherein the diameter of said proximal hole of said over-shell is essentially adapted to the diameter of said connector or neck of said die.

* * * * *